United States Patent [19]
Bhaskaran et al.

[11] Patent Number: 5,467,131
[45] Date of Patent: Nov. 14, 1995

[54] METHOD AND APPARATUS FOR FAST DIGITAL SIGNAL DECODING

[75] Inventors: Vasudev Bhaskaran, Mountain View; Ruby B. Lee, Los Altos Hills, both of Calif.

[73] Assignee: Hewlett-Packard Company, Palo Alto, Calif.

[21] Appl. No.: 175,445

[22] Filed: Dec. 30, 1993

[51] Int. Cl.$^6$ ............................... H04N 7/30; H04N 7/32
[52] U.S. Cl. ............................. 348/384; 348/390
[58] Field of Search ..................... 348/403, 404, 348/405, 406, 409, 395, 426, 699, 384, 390, 408; 382/43, 49, 56; H04N 7/33, 7/137

[56] References Cited

U.S. PATENT DOCUMENTS

| | | | |
|---|---|---|---|
| 4,837,724 | 6/1989 | Borgers et al. | 348/403 |
| 5,031,038 | 7/1991 | Guillemot et al. | 348/403 |
| 5,253,192 | 10/1993 | Tufts | 346/726 |
| 5,280,349 | 1/1994 | Wang et al. | 348/409 |
| 5,329,318 | 7/1994 | Keith | 348/699 |

OTHER PUBLICATIONS

W. H. Chen, C. H. Smith, S. C. Fralick, *A Fast Computational Algorithm for the Discrete Cosine Transform*, IEEE Trans, Communications, vol. COM–25, pp. 1004–1009 (Sep. 1977).

B. G. Lee, *A new algorithm to compute the discrete cosine transform*, IEEE Trans. on Acoust. Speech and Signal Processing, vol. ASSP–32, No. 6, pp. 1243–1245 (Dec. 1984).

E. Fieg, S. Winograd, *Fast Algorithms for the Discrete Cosine Transform*, preprint of paper submitted to IEEE Trans. on Accoust. Speech and Signal Processing.

S. Winograd, *O Computing the Discrete Fourier Transform*, Mathematics of Computation, vol. 32, No. 141, pp. 175–199 (Jan. 1978).

R. B. Lee, *Precision Architecture*, IEEE Computer (Jan. 1989).

"Algorithms for Length 15 and 30 Discrete Concise Transform", Wang et al., ©1991, IEEE, pp. 111–115.

"Fast–Two–Dimensional Inverse Discrete Cosine Transform For HDTV or Videophone Systems", Yang et al., IEEE Trans. on Cons. Electronics, vol. 39, No. 4, Nov. 1993, pp. 934–940.

*Primary Examiner*—Tommy P. Chin
*Assistant Examiner*—Vu Le

[57] ABSTRACT

An inverse discrete cosine transform ("IDCT") implementation specifically for the decompression of JPEG, MPEG and Px64 encoded image and video data uses a preprocessing step embedded in a Huffman decoding process to classify data blocks prior to computing the IDCT. The use of data block classification, along with the use of pruned IDCTs appropriate for the specific block class, reduces the total number of multiply and addition operations necessary to decompress an encoded data block, and thereby allows faster data decompression. Synthesis of coefficients suitable for multiplication allows efficient implementation of the novel decompression technique in typical microprocessor architectures, including RISC processor architectures.

14 Claims, 3 Drawing Sheets

METHOD AND APPARATUS FOR FAST DIGITAL SIGNAL DECODING

BACKGROUND OF THE INVENTION

1. Technical Field

The present invention relates to digital signal processing. More particularly, the present invention relates to digital signal decompression.

2. Description of the Prior Art

With the emergence of image and video compression standards, such as those promulgated by the Joint Photographics Experts Group ("JPEG"), the Moving Pictures Experts Group ("MPEG"), and the Px64 standard, there has been considerable research toward developing fast algorithms to perform the data coding functions outlined in the standards.

The JPEG, MPEG1, MPEG2, and Px64 standards employ essentially the same decompression framework. The main decompression pipeline for these standards is shown in FIG. 1. During decompression, a compressed bit stream 10 is provided to a Huffman decoder 12. The Huffman decoded signal is inverse quantized 14 and then a two-dimensional inverse discrete cosine transform ("IDCT") operation 16 is performed on the signal to complete the decompression process.

Image and video compression standards, such as JPEG, MPEG, and Px64, rely on a two-dimensional 8×8 IDCT as the key processing function during data decompression. The IDCT is inherently a compute-intensive task, i.e. direct calculation of an 8×8 IDCT requires 4096 multiply-accumulate operations.

In the prior art, an 8×8 IDCT is performed as eight 8-point row IDCTs, followed by eight 8-point column IDCTs. This approach is commonly referred to as the row-column approach. A single 8-point IDCT is specified by the following equation:

$$s[x] = \sum_{u=0}^{u=7} C[u]S[x]\cos \frac{(2x+1)\pi u}{16} \quad (1)$$

where, $$C[0] = \frac{1}{2\sqrt{2}}, C[1] \ldots C[7] = 1/2. \quad (2)$$

In matrix form, this equation can be written as s=A S, where A is referred to as the IDCT basis and is:

$$A[x,u] = C[u]\cos \frac{(2x+1)\pi u}{16} \quad (3)$$

If the row-column approach is used to calculate s, then an 8-point IDCT calculation requires sixty-four multiply operations and sixty-four addition operations. This amounts to 1024 multiply operations and 1024 addition operations for an 8×8 IDCT calculation. Such operations still require considerable time, compute power, and memory.

It is possible to factor A[i,j] as a product of several sparse matrices. This is the basic approach behind many known fast algorithms for IDCT calculations. Different approaches towards this factorization are discussed in W. H. Chen, C. H. Smith, S. C. Fralick, *A Fast Computational Algorithm for the Discrete Cosine Transform*, IEEE Trans. Communications, Vol. COM-25, pp. 1004–1009, September 1977; and B. G. Lee, *A New Algorithm to Compute the Discrete Cosine Transform*, IEEE Trans. on Acoust., Speech and Signal Processing, Vol. ASSP-32, No. 6, pp. 1243–45, December 1984. Both of these known schemes reduce the operation counts to 192–256 multiply operations and 416–464 addition operations for an 8×8 IDCT.

In a decompression context, the IDCT is preceded by an inverse quantization step which essentially takes the Huffman decoder output matrix entries h[i,j] and multiplies h[i,j] by q[i,j] to generate the IDCT input matrix. Since the inverse quantization step has to be performed, it is possible to write the IDCT matrix A as the product of two matrices:

$$A=DF, \quad (4)$$

where D is a diagonal matrix and F is another 8×8 matrix. Since, D is a diagonal matrix, q[i,j] can first be scaled by the entries in D, and the IDCT input matrix can then be generated.

Thus, the development of a fast algorithm for the IDCT operation in the various decoding standards requires development of a sparse factorization on F[i,j] and not on A[i,j], as was the case in the Chen or Lee DCT algorithms. This approach is referred to as a scaled IDCT, and was recently described in E. Feig, S. Winograd, *Fast Algorithms for the Discrete Cosine Transform*, preprint of paper submitted to IEEE Trans. on Acoust., Speech and Signal Processing.

The scaled IDCT exploits the scaling feature of the algorithm to reduce the number of IDCT operations to 54 multiply operations, 462 addition operations, and 6 shift right by one operations. Unfortunately, Feig and Winograd's implementation requires access to two-dimensional data within some of its computation stages; i.e. it is not a true row-column approach. Thus, all of the 64 entries in the 8×8 IDCT input have to be available in the registers (local storage) of the CPU. Whereas, in the row-column approach, only eight entries in the 8×8 IDCT input need to be available in the local storage of the CPU at any given time. The row-column approach would therefore be preferred because it makes efficient use of the finite local storage of the CPU.

Continual progress should be made in implementing the various coding standards to improve real time encoding and decoding of digital information, while simplifying hardware designs, processor speed requirements and complexity, and memory requirements, if the full potential of the emerging multi-media technologies is to be realized.

SUMMARY OF THE INVENTION

The present invention provides a method and apparatus for digital signal decoding that uses a fast implementation of an 8×8 inverse discrete cosine transform ("IDCT") to decompress data encoded according to the JPEG, MPEG, and Px64 image and video compression standards. The invention also provides architectural enhancements to RISC architecture that improve the performance of such processors during real time data decompression operations.

During digital signal decoding, as implemented by the present invention, the number of mathematical operations that must be performed during the 8×8 IDCT calculation is reduced to 80 multiply operations and 464 addition operations for the JPEG, MPEG1, MPEG2, and Px64 decompression standards. The reduction in mathematical operations afforded by the invention is based on the discovery that for most compressed data sets a full 8×8 IDCT calculation need not be performed. Thus, the invention provides a scheme for reducing the number of multiply operations and addition operations for such data sets.

3

The decoder of the invention uses a preprocessing step embedded in a Huffman decoding process to classify data blocks prior to performing the IDCT calculation. In particular, during the Huffman decoding step, the invention implements a specific Huffman decoder that yields information on the sparseness of the data matrix for which the inverse DCT is to be calculated. The use of data block classification, along with the use of pruned IDCTs appropriate for the specific data block class, reduces the total number of multiply and addition operations necessary to decompress a data block, and thereby provides faster, less hardware-intensive data decompression. Although multiply operations are performed in the decompression scheme of the invention using only a small number of shift and add operations, an output is yielded that is close to one which would have been obtained using unlimited precision arithmetic.

The invention also allows synthesis of coefficients that are suitable for multiplication, such that the novel decompression technique taught herein is readily implemented in a typical RISC processor architecture (see R. B. Lee, *Precision Architecture*, IEEE Computer, January 1989). The dynamic range of the data permits computation of the IDCT using 16-bit arithmetic. Accordingly, the invention is implemented using simple enhancements to a RISC processor architecture that facilitate efficient mapping of the IDCT operation. This enhancement allows parallel processing of the data and leads to significant increase in the speed with which the IDCT calculations can be performed. For example, software implementations of MPEG decompression running on a RISC processor according to the invention have yielded real-time performance for typical MPEG-1 compressed streams.

DETAILED DESCRIPTION OF THE INVENTION

Figure 1:
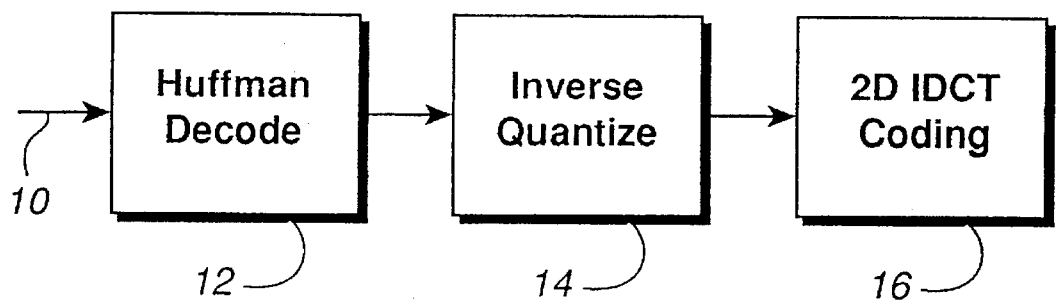
FIG. 1 is a block level schematic diagram of a generic decompression pipeline for the JPEG, MPEG, and Px64 DCT based compression schemes.

The basic decompression process in the JPEG, MPEG, and Px64 data coding standards is as shown in, and discussed in connection with, FIG. 1. The data corresponding to an 8×8 data block are Huffman decoded in a Huffman decoder 12. Huffman decoding converts a variable length string to a fixed length set of symbols. In the worst case, there are sixty-four non-zero values for an 8×8 data block. The inverse quantizer 14 then converts these symbols into a set of values appropriate for the IDCT calculation 16. The IDCT output may then be further processed if decompression is for data that has been encoded in accordance with the MPEG or Px64 data coding standards.

The invention implements a specific Huffman decoder that yields information on the sparseness of the matrix for which the IDCT is to be performed using a row-column approach. The row-column approach has the advantage over Feig's scheme (discussed above) in that at any given time, fast processor local storage is needed for only eight sequential data points (i.e. a row or a column). This approach is particularly advantageous within a typical RISC processor which has few general purpose registers in the integer unit, where usually only up to 30 registers are available for data. This implies that only 20 data values can be efficiently stored and processed, not counting registers for loop control, addressing, and branching. Therefore, the entire 8×8 array cannot be stored and processed in the registers.

Figure 2:
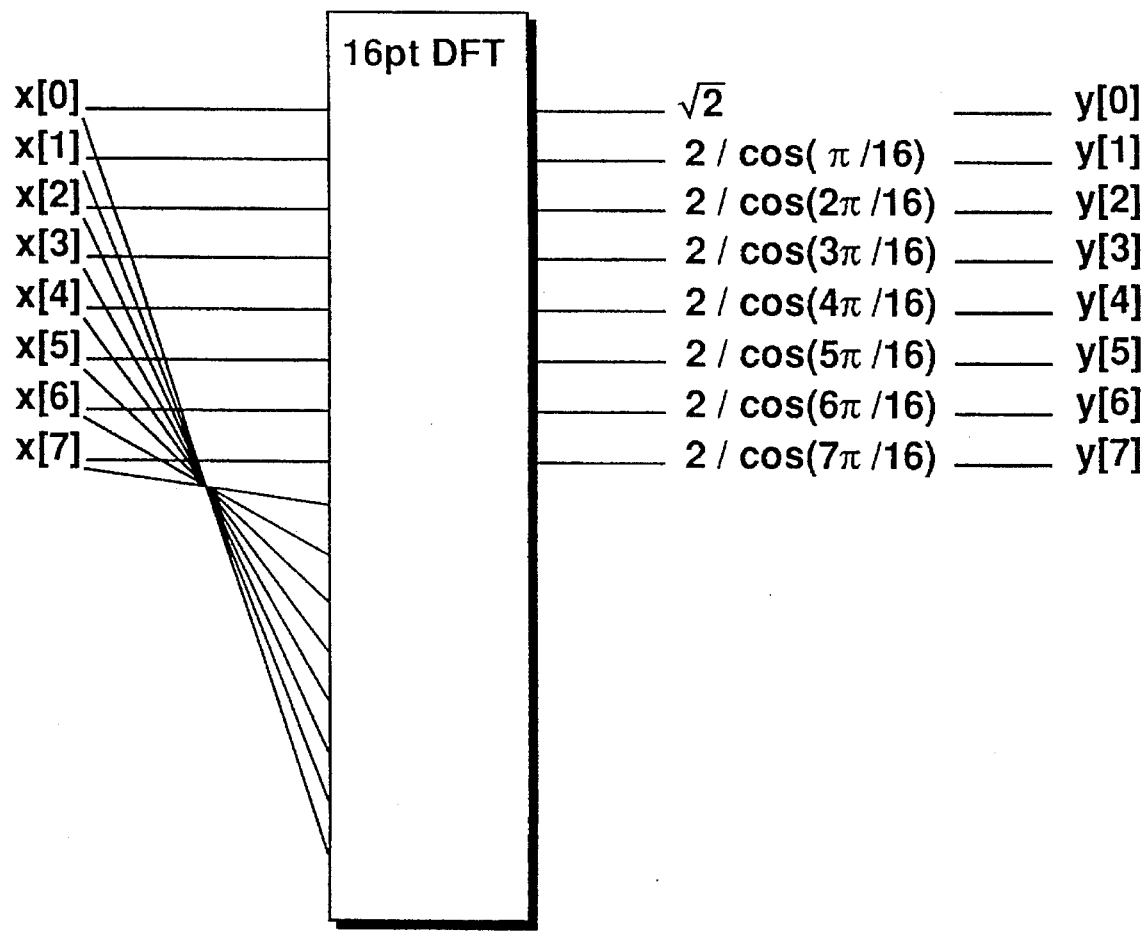
FIG. 2 is a process flow diagram showing an implementation of a digital signal decoding step in which a discrete Fourier transform is substituted for a discrete cosine transform according to the present invention.

One important aspect of the invention is the calculation of the 8-point DCT via a discrete Fourier transform ("DFT") as discussed in K. R. Rao and P. Yip, "Discrete Cosine Transform—Algorithms, Advantages and Applications," pp. 49–51, Academic Press, 1990. The process of computing a DCT from a DFT is depicted in FIG. 2, which is a process flow diagram showing an implementation of a digital signal decoding step in which a DFT is substituted for a DCT according to the present invention. Note that the process of computing an IDCT from an IDFT would require traversal of the blocks shown in the figure in the reverse order, i.e. right to left in FIG. 2.

In the compression case, the DFT scheme implemented in the invention requires the synthesis of a 16-point sequence from an 8-point input sequence.

Given an 8-point DCT sequence X[k], k=0, 1, . . . , 7, a 16-point sequence, x[k] is synthesized as:

$$x[k]=X[k], k=0, 1, \ldots, 7; x[k]=X[15-k], k=8, 9, \ldots, 15 \tag{5}$$

A 16-point DFT is then performed, and the first eight values are scaled by $$\sqrt{2}, 2/\cos\left(k\frac{\pi}{16}\right), k=1, 2, \ldots 7$$

as shown in FIG. 2. This is the DCT output. The scaling operation can be viewed as multiplying the DFT output (the 8-point vector shown in FIG. 2) by a diagonal matrix in which the diagonal entries are the values $$\sqrt{2}, 2/\cos\left(k\frac{\pi}{16}\right), k=1, 2, \ldots 7$$

as shown in FIG. 2. This diagonal matrix can be embedded in the quantization process. In the decompression context, the diagonal matrix can be incorporated in the inverse quantizer scaling matrix.

Scaling induces two effects:

(1) it reduces the dynamic range of the data that are input to the IDCT; and (2) it yields a sparse factorization of the DFT matrix that only requires a few multiplication and addition operations.

It is necessary to use an efficient 16-point DFT in the decoding procedure. An exemplary IDFT method that may be used in practicing the invention is described in S. Winograd, *On Computing the Discrete Fourier Transform*, Mathematics of Computation, Vol. 32, No. 141, pp.

175–199, January 1978. Winograd provides tables of equations for various DFT sizes. These equations are implemented in the invention during the DFT calculations with the following modifications:

(1) only compute the first eight terms in the DFT; and (2) discard all calculations that use imaginary values because a real-valued output is expected.

Figure 3:
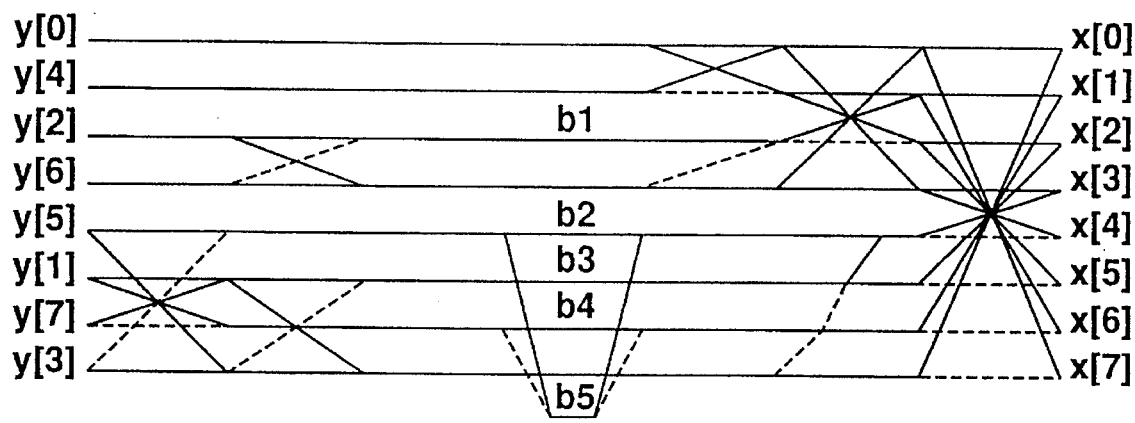
FIG. 3 is a process flow diagram for an 8-point IDCT according to the present invention.

FIG. 3 is a process flow diagram for an 8-point scaled IDCT according to the present invention. Note that an 8-point IDCT requires five multiplication operations and twenty-nine addition operations. Thus, the IDCT calculation, as implemented in the invention, involves embedding the IDFT to IDCT prescaling within the inverse quantizer matrix, followed by the use of an efficient 16-point IDFT method to compute the desired 8-point IDCT.

It has been discovered that a large number of data at the output of the Huffman decoder are zero-valued, i.e. the 8×8 matrix denoted as H tends to be sparse at the input of the inverse quantizer. Based on a large data set comprising JPEG, MPEG and Px64 compressed bit streams, it has been found that the sparse matrix tends to be in one of the following classes:

Type-0. Only H[0,0] is nonzero.

Type-1. Only one of the H[i,j] is nonzero and H[0,0] is zero.

Type-2. Only the upper 2×2 submatrix of H has nonzero values, i.e. some or all of H[i,j], i=0,1, j=0,1 are non-zero. The remaining H[i,j] entries in the 8×8 matrix are zero valued.

Type-3. Only the upper 4×4 submatrix of H has nonzero values, i.e. some or all of H[i,j], i=0, 1, . . . , 3, j=0, 1, . . . , 3 are nonzero. The remaining H[i,j] entries in the 8×8 matrix are zero valued.

Type-4. H is not a member of any of the above-mentioned classes, i.e. the occupancy pattern in H is random.

Experiments indicate that 20–60% of the 8×8 data blocks fall into one of the Type-0, . . . , Type-3 classes. An important feature of the invention is that since blocks in these classes contain sparse data, it is possible to use an efficient flow graph for computing the IDCT in such cases.

The actual implementation of a system for classifying a data block as a member of one of the above-mentioned classes is possible because the Huffman coded data contains position as well as value information. In the preferred embodiment of the invention, a classification scheme may be used to sort data blocks by content as follows: As each symbol is decoded by the Huffman decoder, its position information can be used to set a bit in a 64-bit mask. When all of the data for an 8×8 block have been decoded, as indicated by the arrival of the End-of-block code at the input of the Huffman decoder, the 64-bit mask is compared against stored 64-bit templates specific to the block classes mentioned earlier. Although this process marginally increases the computations in the Huffman decoder, the reduction in the IDCT complexity well outweighs the increase in Huffman decoder complexity.

The basic computation procedures for the inverse quantization and IDCT of a 8×8 array is as follows:

1. Let H[ ] be an 8×8 array for which inverse quantization and IDCT has to be performed. Note that H[ ] is the output of the Huffman decoder.

2. The inverse quantization is performed as:

$$Y[\ ]=S[\ ](x)H[\ ], \qquad (6)$$

where, (x) denotes pointwise multiplication, i.e. $Y[i,j]=S[i,j]*H[i,j]$; $S[\ ]$ is referred to as the descaling matrix; and $$S[i,j]=b[j]*b[i]*q[i,j], i=0, \ldots, 7, j=0, \ldots, 7$$

$$b[i]=a[i], i=0, \ldots, 7$$

$$a[i]=\cos(i*pi/16)/(2*c[i])$$

$$c[0]=1/\sqrt{2}, c[1]=c[2]=\ldots c[7]=1$$

Note that q[0,0], . . . , q[7,7] are the quantization matrix entries specified during compression. S[ ] can be computed at the start of the decompression process and thus need not be computed during the decompression of each 8×8 block.

3. Preshift the DCT term, i.e. Y[0,0] to account for the shift of +128 in the spatial domain that is usually performed during the compression process. This preshifting is:

$$Y[0,0]=Y[0,0]+128 \qquad (7)$$

4. Compute the IDCT of Y[ ] as X[ ]. The IDCT computation is performed by first computing the IDCT of each of the eight rows of Y[ ]. The rowwise computation of IDCT follows the flowgraph depicted in FIG. 3. Denote the resulting 8×8 matrix as T[ ]. An 8-point IDCT of each column of T[ ] is performed to yield the desired 8×8 IDCT. Note that the 8-point IDCT of each column also follows the flowgraph depicted in FIG. 3.

The basic computation steps as outlined here, require:

a) 64 multiplication operations to compute Y[ ].

b) one addition operation to compute preshifted Y[0,0].

c) 80 multiplication and 464 addition operations to compute the X[ ] which is the IDCT of Y[ ].

The operations count for this procedure as described here can be significantly reduced for blocks belonging to Type-0, Type-1, Type-2 and Type-3 classes.

TYPE-0 BLOCKS

For Type-0 blocks, the computation procedure for an 8×8 IDCT is as follows:

1. Compute only the (0,0) entry in equation (6). This requires one multiplication operation.

2. Perform the preshifting operation as per equation (7). This requires one addition operation.

3. Set X[i,j]=Y[0,0], i=0, . . . , 7, j=0, . . . , 7. In an implementation, this requires 63 copy operations.

This is the 8×8 IDCT.

Thus, for a Type-0 block the multiply operation count is reduced from 144 multiply operations to one multiply operation, and the addition operation count is reduced from 465 addition operations to one addition operation.

TYPE-1 BLOCKS

For Type-1 blocks, the calculations are identical to those for Type-0 blocks.

TYPE-2 BLOCKS

For Type-2 blocks, some or all of H[i,j], i=0,1 j=0,1 are nonzero. Thus, from equation (6), only Y[i,j], i=0,1 j=0,1 need be computed; and the remaining Y[i,j] are zero. The computation procedure for 8×8 IDCT of a Type-2 block is:

1. Compute Y[i,j], i=0,1 j=0,1 as per equation (6). This requires four multiplication operations.

2. Perform the preshifting operation as per equation (7). This requires one addition operation.

Figure 4:
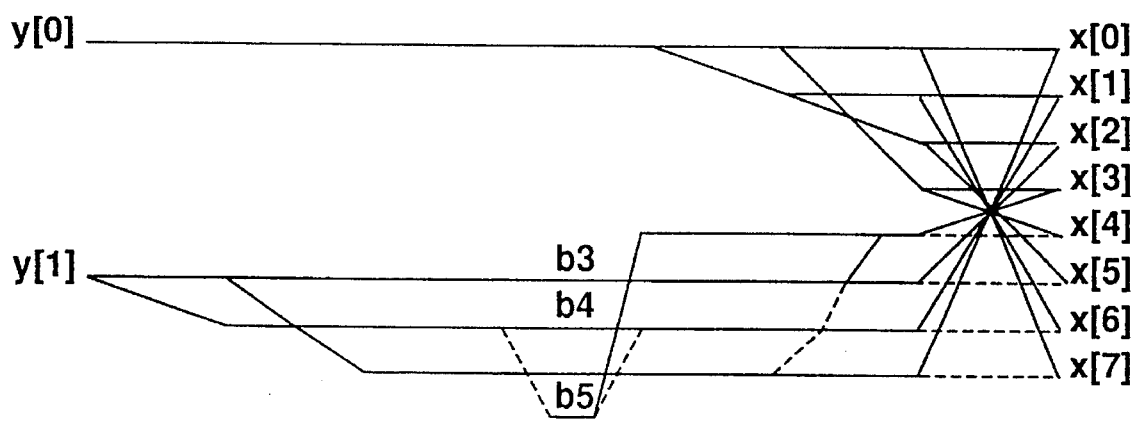
FIG. 4 is a flow diagram showing IDCT computation for a Type-2 block according to the present invention.

3. Compute the 8×8 IDCT X[ ] from Y[ ] using the procedure described earlier for a generic IDCT. Since Y[i,j] is nonzero for some or all of i=0,1 j=0,1, a pruned flowgraph is used for computing the 8-point IDCT. This flowgraph is shown in FIG. 4. Using the row-column approach and this pruned flowgraph, an 8-point IDCT is performed on the first two rows of Y[ ]. Then an 8-point IDCT is performed on the eight columns using the pruned flowgraph. The row-column approach and this pruned flowgraph results in 30 multiply and 120 add operations.

Thus, for a Type-2 block, the number of multiply operations are reduced from 144 multiply operations to 34 multiply operations, and addition operations are reduced from 465 addition operations to 121 addition operations.

TYPE -3 BLOCKS

For Type-3 blocks, some or all of H[i,j], i=0, . . . , 3 j=0, . . . 3 are nonzero. Thus, from equation (6), only Y[i,j], i=0, . . . , 3, j=0, . . . , 3 need be computed; and the remaining Y[i,j] are zero. The computation procedure for an 8×8 IDCT of a Type-3 block is:

1. Compute Y[i,j], i=0, . . . , 3 j=0, . . . , 3 as per equation (6). This requires 16 multiplication operations.

2. Perform the preshifting operation as per equation (7). This requires one addition operation.

Figure 5:
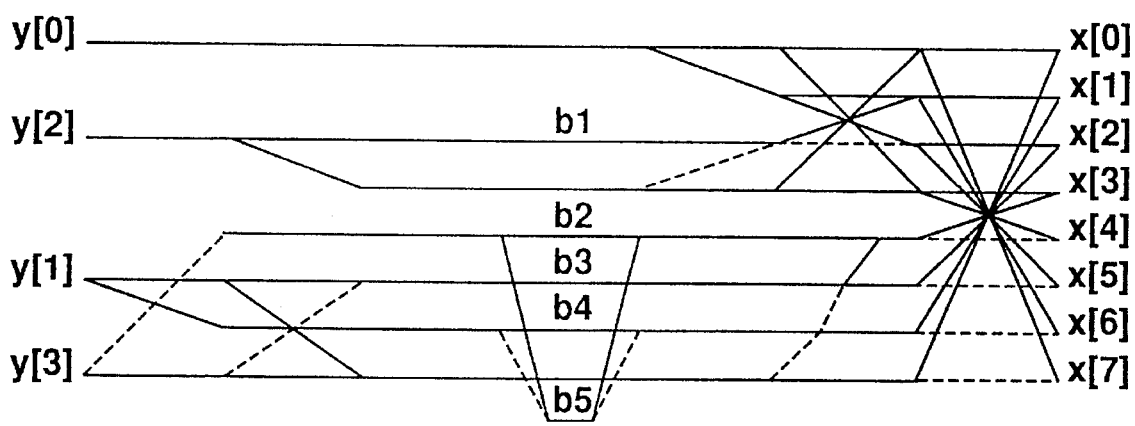
FIG. 5 is a flow diagram showing IDCT computation for a Type-3 block according to the present invention.

3. Compute the 8×8 IDCT X[ ] from Y[ ] using the procedure described earlier for a generic IDCT. Since Y[i,j] is nonzero for some or all of i=0, . . . , 3 j=0, . . . , 3, a pruned flowgraph is used for computing the 8-point IDCT. This flowgraph is shown in FIG. 5. Using the row-column approach and this pruned flowgraph, an 8-point IDCT is performed on the first four rows of Y[ ]. Then an 8-point IDCT is performed on the eight columns using the pruned flowgraph. The row-column approach and this pruned flowgraph results in 60 multiply operations and 252 add operations.

Thus, for a Type-3 block, the multiply operations are reduced from 144 multiply operations to 61 multiply operations, and addition operations are reduced from 465 addition operations to 253 addition operations.

TYPE-4 BLOCKS

For Type-4 blocks, the operations are as outlined in the generic IDCT case. There are no savings in the number of required multiply and addition operations.

In general, due to the large number of Type-0, Type-1, Type-2 and Type-3 blocks, based on the operations count described for each case, multiply and add operations can be reduced by at least one-half when compared with prior art decoding where no block classification is performed.

Even though square blocks are used in the foregoing classification process, rectangular or even triangular blocks may be used in the invention to yield significant reduction in computation. In MPEG, triangular blocks, i.e. blocks wherein only H[0,0] H[0,1] and H[1,0] are nonzero are quite frequent for predicted frames.

JPEG, MPEG and Px64 compression standards require that prior to compression the data be level shifted by 128, i.e. the input to the compressor is a sequence:

$$x[i,j]=X[i,j]-128 \qquad (8)$$

On the decompression side, this effect has to be undone, i.e. the output of the IDCT has to be level-shifted by 128. If this operation is done in the spatial domain, sixty-four addition operations are required for each 8×8 data block. This process can be modified to a frequency domain operation instead of the spatial domain operation by level-shifting only the (0,0) entry of the 8×8 IDCT input array. This step reduces the number of addition operations from sixty-four addition operations to one addition operation in an 8×8 data block.

The row-column approach lends itself to efficient use of registers in a reduced instruction set computer ("RISC") architecture. The IDCT operation itself is skewed towards addition operations. Most RISC architecture do not have a dedicated multiplier unit in the integer arithmetic logic unit ("ALU"). If they did, it normally takes multiple cycles to perform an integer multiply compared to one cycle to perform an integer add or subtract. Therefore, by reducing the number of multiply operations, the decompression scheme of the invention is more efficient on such RISC architecture.

The use of a prescaling matrix in the IDCT implementation of the invention leads to a reduction in the dynamic range at the IDCT input. Thus, 16-bit arithmetic could be used to compute the IDCT. This should not generate overflows. This feature of the invention is exploited in the RISC architecture by using 16-bit (halfword) additions and subtraction where needed in the IDCT. The use of halfword instructions results in two rows or columns being processed in the same time that it would take to process a single row or column if 32-bit (word) arithmetic were used.

Figure 6:
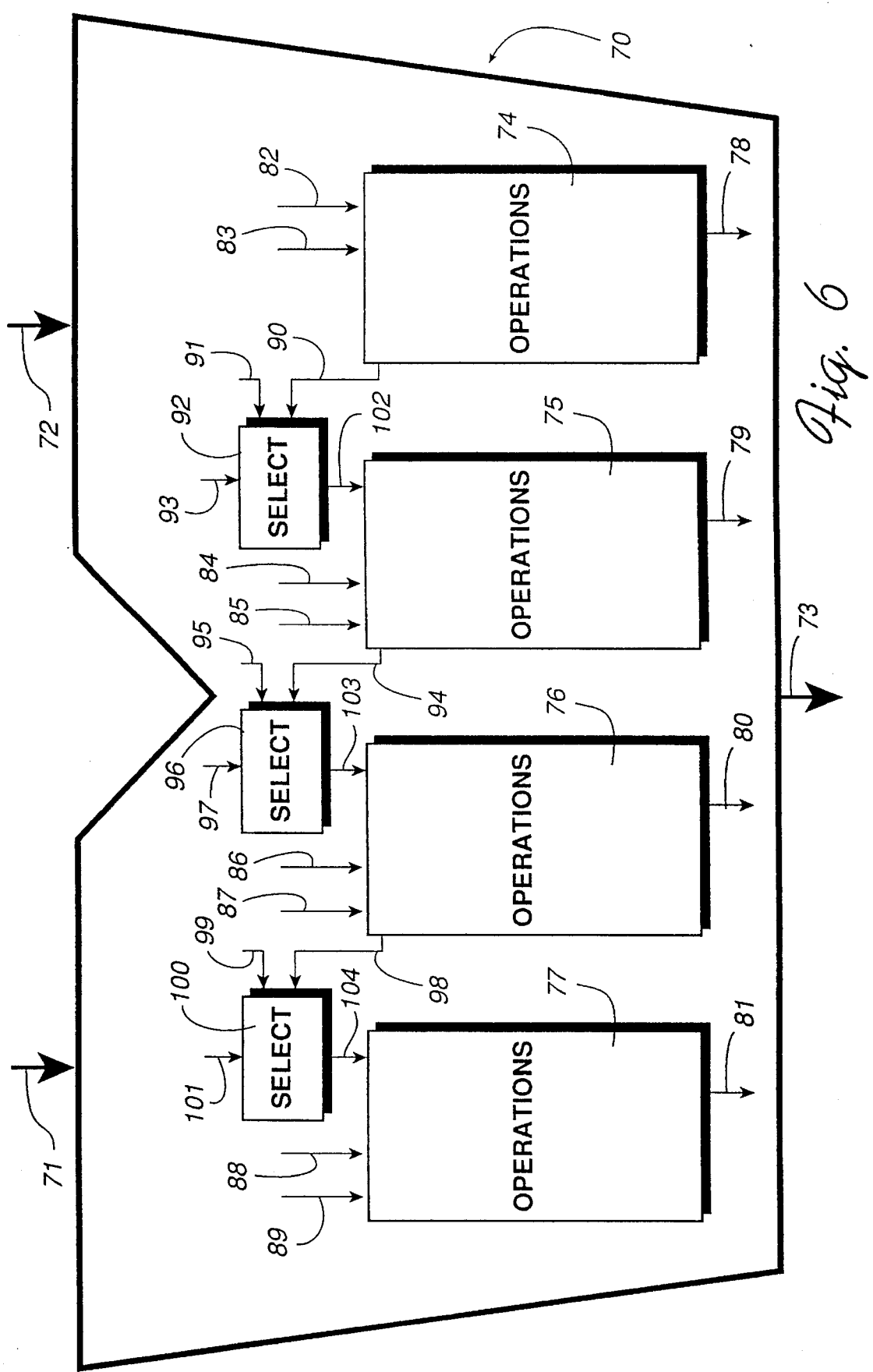
FIG. 6 is a block level schematic diagram of an arithmetic logic unit ("ALU") for a reduced instruction set computer ("RISC") showing a configurable parallel processing path according to the present invention.

FIG. 6 is a block level schematic diagram of an arithmetic logic unit ("ALU") for a reduced instruction set computer ("RISC") showing a configurable parallel processing path according to the present invention. In the figure, an ALU 70 for a RISC processor includes a preshift input 71 and a complement input 72, and it provides a calculated output 73. Within the ALU 70, the basic processing path is partitioned into multiple narrower processing paths 74, 75, 76, 77 that provide a corresponding series of calculated outputs 78, 79, 80, 81. Each narrower processing path 74, 75, 76, 77 includes a series of data inputs 82/83, 84/85, 86/87, 88/89, respectively. Additionally, as shown in the figure, at least three of the four processing units 75, 76, 77 include an input 102, 103, 104 that is adapted to receive a carry-over value 90, 94, 98 from a previous processing unit, when the ALU is configured for full precision arithmetic; and that is adapted to receive an input value 91, 94, 99, when the ALU is configured for parallel processing with lower precision arithmetic, for example in connection with implementation of the decompression scheme of the invention. Selection of precision or parallel processing mode is controlled by a select signal 93, 97, 101 that is applied to a select latch 92, 96, 100.

Note that in the IDCT (for example as shown on FIG. 3), it is still necessary to perform five multiplication operations for an 8-point IDCT. The invention provides a simple sequence of shift-add instructions that efficiently implement the multiply operations. The parameters for the shifts and the number of shift-add operations is preferably chosen such that no overflow occurs during the computations. Additionally, the shift-add operations are preferably restricted to shift-right by 1, 2, or 3 to allow the above architectural enhancement of a RISC processor architecture, such that the invention provides a significant performance increase in the speed of IDCT calculations during data block decompression, i.e. by classifying data blocks for sparseness to minimize the number of calculations performed, and by performing these operations in a parallel fashion in the RISC processor.

Referring to the flow diagram shown on FIG. 3,

If b1, b3=1.41421356 is written as 1+(¼[1+½+⅛ (1+¼)], then a multiply by b1 can be implemented with four shiftright and add instructions.

If b2=−2.61312587 is written as −3+¼[1+½+⅛ (¼+⅛)], then a multiply by b2 can be implemented with five shiftright and add instructions.

If b4=1.0823922 is written as 1+⅛[½(1+¼ (1+¼))], then a multiply by b4 can be implemented with three shift-right and add instructions.

If b5=0.76536686 is written as 1−⅛(1+½+¼+⅛), then a multiply by b5 can be implemented with four shift-right and add instructions.

The RISC architecture according to the invention includes the shift-right and add instruction to allow the IDCT multiplication to be performed efficiently. Shift-left and add may be used instead of shift-right and add, or a combination of shift-right and shift-left may be used for efficient synthesis of the multiply operations. Note that for shift-left and add, the invention scales the coefficients b1–b5 by an integer scale factor K prior to performing the multiply operations by a sequence of shift left and adds. In the shift-right and add case, the data are scaled to achieve a high degree of accuracy in the computed result; whereas in the shift-left case, the coefficients are scaled to achieve the desired accuracy in the IDCT. Scaling the data or the coefficients is identical as long as all of the data undergo the same scaling in either case.

As discussed earlier, in the decoding process the IDCT is s=A S. If the data are prescaled (for example when performing shift-right and add operations), S is premultiplied by a diagonal matrix D, having values that are all equal to K. Instead of s, si=A D S is calculated. If the coefficients are prescaled (for example when performing shift-left and add operations), a different scaling matrix S' is used on the data. The matrix A is multiplied by a diagonal matrix D' having values that are all equal to K'. Thus, instead of s, sj=D'AS' is calculated. To get the value of s, the output of the IDCT is postscaled. Matrices D1, S' are such that ADS=D'AS'. Hence, si=sj, and scaling the coefficients yields the same result as scaling the data.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A method for decompressing a compressed data bitstream, comprising the steps of:

Huffman decoding a variable length string in said data bitstream to produce an output therefrom in the form of a fixed length set of symbols contained in a data block;

classifying said data block for sparseness based upon data occupancy within said data block, wherein said classifying step further comprises:

classifying said data blocks in accordance with a classification scheme wherein each data block is defined as a sparse matrix H, and where each of said data blocks is placed into one of the following classes based upon data occupancy within said data block:

Type-0 — only H[0,0] is nonzero;

Type-1 — only one of the H[i,j] is nonzero and H[0,0] is zero;

Type-2 — only an upper 2×2 submatrix of H has nonzero values, where some or all of H[0,0], H[0,1], H[1,0] and H[1,1] are non-zero;

Type-3 — only an upper 4×4 submatrix of H has nonzero values, where some or all of H[i,j], i=0, 1, . . . , 3, j=0, 1, . . . , 3 are nonzero; and Type-4 — H is not a member of any of the above-mentioned classes, where the occupancy pattern in H is random;

inverse quantizing to convert said symbols in said data block into a set of values adapted for an inverse discrete cosine transform calculation; and performing an inverse discrete cosine transform ("IDCT") operation based upon data block classification;

wherein the overall number of calculations performed during said IDCT operation are a function of the data sparseness within said data block.

2. The method of claim 1, further comprising the step of:

simultaneously processing in parallel at least one of multiple rows and columns of said data block in an arithmetic logic unit to perform at least one said IDCT operation.

3. The method of claim 1, wherein said compressed data bitstream is compressed in accordance with one of the MPEG, JPEG, and Px64 image and video compression standards.

4. The method of claim 1, wherein said step for performing said IDCT operation further comprises:

calculating said IDCT using shift-add operations only for multiplications.

5. The method of claim 1, further comprising the step of:

reducing the dynamic range of said set of values operated upon while performing said IDCT with a prescaling matrix.

6. The method of claim 1, further comprising the step of:

level shifting an output produced by said IDCT operation.

7. The method of claim 1, wherein said data block classifying step classifies each data block based on any selected subset of said data block.

8. An apparatus for decompressing a compressed data bitstream, comprising:

a Huffman decoder for decoding a variable length string in said data bitstream and for providing an output in the form of a fixed length set of symbols contained in a data block;

means for classifying each said data block for sparseness based upon data occupancy within said data block, said means for classifying further comprising;

means for selecting data block type in accordance with a classification scheme where each data block is based upon a sparse matrix H, and where each of said data blocks is placed into one of the following classes based upon data occupancy within said data block:

Type-0 — only H[0,0] is nonzero;

Type-1 — only one of the H[i,j] is nonzero and H[0,0] is zero;

Type-2 — only an upper 2×2 submatrix of H has nonzero values, where some or all of H[0,0], H[0,1], H[1,0] and H[1,1] are non-zero;

Type-3 — only an upper 4×4 submatrix of H has nonzero values, where some or all of H[i,j], i=0, 1, . . . , 3, j=0, 1, . . . , 3 are nonzero; and Type-4 — H is not a member of any of the above-mentioned classes, where the occupancy pattern in H is random;

an inverse quantizer for converting said symbols in each data block into a set of values appropriate for an inverse discrete cosine transform calculation; and a processor for performing an inverse discrete cosine transform ("IDCT") operation based upon data block classification;

wherein the overall number of calculations performed during said IDCT operation are a function of data sparseness within each of said data blocks.

9. The apparatus of claim 8, further comprising:

an arithmetic logic unit adaptable to operate as a parallel processor for simultaneously processing at least one of multiple rows and columns of said data block when performing at least one said IDCT operation.

10. The apparatus of claim 8, wherein said compressed data bitstream is compressed in accordance with one of the MPEG, JPEG, and Px64 image and video compression standards.

11. The apparatus of claim 8, further comprising:

an operations processor adapted to calculate said IDCT using shift-add operations only for multiplication.

12. The apparatus of claim 8, further comprising:

a prescaling matrix for reducing the dynamic range of said set of values operated upon while performing said IDCT.

13. The apparatus of claim 8, further comprising:

a level shifter for level shifting an output produced by said IDCT operation.

14. The apparatus of claim 8, wherein said data block classifying means classifies each data block based on any selected subset of said data block.

* * * * *